United States Patent

Bonniau et al.

[11] Patent Number: 5,672,008
[45] Date of Patent: Sep. 30, 1997

[54] RECONFIGURABLE MULTIPOINT TEMPERATURE SENSOR

[75] Inventors: Philippe Bonniau, Houilles; Jean Chazelas, Paris; Marc Turpin, Bures S/Yvette, all of France

[73] Assignee: Thomson-CSF, Paris, France

[21] Appl. No.: 379,431

[22] PCT Filed: Jun. 10, 1994

[86] PCT No.: PCT/FR94/00691

§ 371 Date: Feb. 2, 1995

§ 102(e) Date: Feb. 2, 1995

[87] PCT Pub. No.: WO94/29675

PCT Pub. Date: Dec. 22, 1994

[30] Foreign Application Priority Data

Jun. 15, 1993 [FR] France ................. 93 07187

[51] Int. Cl.⁶ ........................................ G01K 11/32
[52] U.S. Cl. .................. 374/161; 374/137; 250/227.14; 356/44; 385/13
[58] Field of Search ................. 374/137, 161, 374/131; 385/12, 13; 250/227.14; 356/44

[56] References Cited

U.S. PATENT DOCUMENTS

| 4,249,924 | 2/1981 | de Panafieu et al. | |
|---|---|---|---|
| 4,712,096 | 12/1987 | Cholin et al. | 374/161 |
| 4,842,403 | 6/1989 | Tarbox et al. | 374/161 |
| 4,882,716 | 11/1989 | Lefevre et al. | |
| 4,926,040 | 5/1990 | Turpin et al. | |
| 4,928,005 | 5/1990 | Lefevre et al. | |
| 4,950,886 | 8/1990 | Claus et al. | 374/161 |
| 4,969,017 | 11/1990 | Lefevre et al. | |
| 4,970,385 | 11/1990 | Tatsumo et al. | 374/161 |
| 5,058,973 | 10/1991 | Refregier et al. | |
| 5,062,153 | 10/1991 | Turpin et al. | |
| 5,064,270 | 11/1991 | Turpin et al. | |
| 5,089,696 | 2/1992 | Turpin . | |
| 5,090,818 | 2/1992 | Kleinerman | 374/161 |
| 5,167,684 | 12/1992 | Turpin et al. | |
| 5,172,184 | 12/1992 | Turpin et al. | |
| 5,191,206 | 3/1993 | Boiarski et al. | 374/161 |
| 5,305,401 | 4/1994 | Becker et al. | |
| 5,309,533 | 5/1994 | Bonniau et al. | |
| 5,309,540 | 5/1994 | Turpin et al. | |
| 5,363,191 | 11/1994 | Refregier et al. | |
| 5,381,005 | 1/1995 | Chazelas et al. | |
| 5,419,636 | 5/1995 | Weiss | 374/161 |

FOREIGN PATENT DOCUMENTS

| 4011440 | 10/1991 | Germany | 374/161 |
|---|---|---|---|
| 56-107137 | 8/1981 | Japan | 374/161 |
| 62-288538 | 12/1987 | Japan | 374/161 |

Primary Examiner—Diego F.F. Gutierrez
Attorney, Agent, or Firm—Oblon, Spivak, McClelland, Maier & Neustadt, P.C.

[57] ABSTRACT

A temperature sensor having a light fiber connecting a light source and a reflectometer. Temperature measurement zones are formed by sensing elements made of shape-memory alloy. The elements exert a stress on the fiber when they are subjected to an increase in temperature due to their memorized state. The change in temperature is detected by the reflectometer.

5 Claims, 2 Drawing Sheets

RECONFIGURABLE MULTIPOINT TEMPERATURE SENSOR

BACKGROUND OF THE INVENTION

The present invention relates to a reconfigurable multipoint temperature sensor.

DISCUSSION OF THE BACKGROUND

Fibre-optic temperature or stress sensors have been the subject of numerous studies throughout the world. The field of intrinsic temperature or stress sensors has expanded particularly by virtue of the use of an optical fibre as the sensor (use of high-birefringence or polarization-maintaining optical fibres).

Production of optical sensors distributed along a birefringent fibre has made it possible to use N elementary sensors corresponding to N segments of sensor fibre. These various segments are defined by using coupling points serving as markers (delimiting these segments).

The production of coupling points on optical fibres has been studied for a long time, and today various production techniques are used, among which are:

- splicing of two sections of the same fibre, that is to say cutting the fibre and bonding the two portions after having rotated one of the fibre portions through an arbitrary angle. The main drawbacks of this method are the introduction of losses due to the reflections off the faces of the fibres and the control of the alignment and rotation of the fibre cores (diameter of the order of 5 μm);

- melting of the fibre using localized heating. A section of the birefringent fibre of chosen length is held at its ends and the fibre is rotated at one end, the other remaining fixed. A torsional stress is thus created. Using localized heating of the fibre, a polarization coupling point is thus produced. The drawbacks of this method are the use of a locally stripped fibre, a high-voltage generator and an electric arc in order to create the coupling point or points, and the irreversibility of the method of creating the coupling points;

- the production of index gratings in the fibre using a masking method or using a holographic method. The production of coupling points using this method is nowadays mainly studied by the BERTIN Company and many studies have concerned the production of index gratings in the fibres for sensor applications. The drawback of this method resides in its complexity of implementation, the need to use an additional high-power laser to produce the index gratings, and the need to employ a process for masking the fibre.

From the document DE-A-4,011,440, a measurement device is known based on an optical fibre associated with a shape-memory material which applies a longitudinal contraction to the fibre when it adopts its memorized state. This device does not make it possible to measure various temperatures or to make measurements at several points with the same optical fibre.

SUMMARY OF THE INVENTION

The subject of the present invention is an optical-fibre multipoint temperature sensor such that it is possible to define several independent temperature sensors on this optical fibre at positions, with respect to the fibre, which can be modified as required or can be defined after installing the fibre, without damaging the fibre or cutting it, without introducing losses, without having recourse to additional equipment, and all this as simply as possible.

The sensor in accordance with the invention, of the fibre-optic type, which interacts with a light source, a device for optically reading a variation in light flux and an element made of shape-memory alloy arranged on the optical fibre, this element being designed and taught so that when it is at temperatures lying on one side of the transition temperature of the constituent material it exerts virtually no stress on the fibre, and when it is at temperatures lying on the other side of the said transition temperature it exerts on the fibre a stress which can be measured by the said read device, is characterized in that the sensor is a multipoint sensor composed of several elements made of shape-memory alloy distributed along the optical fibre and in that the read device is of the time-domain reflectometry (OTDR) type.

BRIEF DESCRIPTION OF THE DRAWINGS

The present invention will be better understood on reading the detailed description of two embodiments, taken by way of non-limiting examples and illustrated by the appended drawing in which.

DESCRIPTION OF THE PREFERRED EMBODIMENTS

Figure 1:
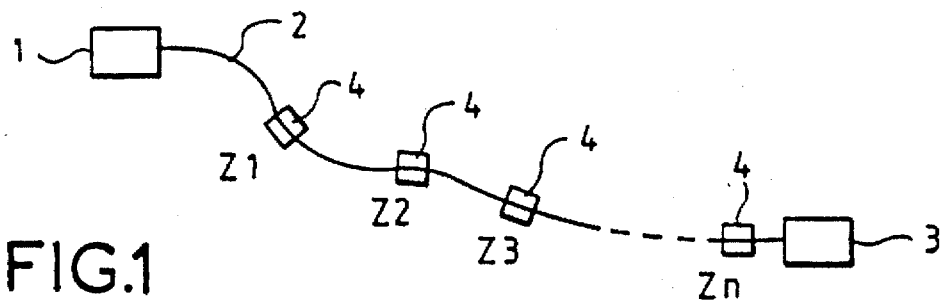
FIG. 1 is a block diagram of a sensor device in accordance with the invention.

The fibre-optic sensor shown diagrammatically in FIG. 1 enables, in a manner known per se, temperatures to be measured (with a relatively low accuracy, but this is sufficient in some fields of application where the temperature does not constitute a critical parameter) by virtue of the invention. The device of the invention enables, as described hereinbelow, temperatures to be determined simply, without using conventional temperature-measurement apparatuses.

The sensor device of FIG. 1 is essentially composed of a light source 1, for example a laser source, the light energy of which is injected into one end of an optical fibre, for example a multimode fibre 2, the other end of which is coupled to a read device 3 employing, for example, time-domain reflectometry known by the name OTDR (Optical Time Domain Reflectometry). The elements 1 to 3, being well known per se, will not be described.

Much work on fibre-optic sensors has concerned the measurement of light-intensity losses induced by stresses applied to the optical fibre. More especially, studies have concerned the production of microbending-type fibre-optic sensors using either monomode or multimode optical fibres. The possibility of producing a low-cost measurement system has steered the work towards multimode optical fibres. The principle of operation of such mechanical-stress sensors is as follows: when a multimode optical fibre is subjected to a pressure alternating spatially, on one side and the other, along the fibre, optical losses appear, which are due to the higher-order mode propagation losses. The production of fibre-optic stress sensors has expanded into two main directions depending on the read system adopted. The measurements of the light-intensity losses can be performed with the aid of a simple photodetector and, in this case, the losses along the entire length of the sensor are cumulated. The measurement may also be carried out by time-domain reflectometry (OTDR) and, in this case, the positions of the sensors may be localized.

In general, the fibre 2 uses multisensors of physical quantities. Instead of producing coupling points according to one of the known procedures described hereinabove, for the purpose of delimiting sensors of mechanical quantities, the invention proposes to produce, at Z1, Z2, etc., zones serving as temperature sensors and, in addition, to render them easily reversible, this making it possible, principally, to reconfigure the arrangement of the temperature sensors (in order to remove or add one or more of them, or in order to move one or more of them) without damaging the fibre. According to the invention, each temperature sensor zone is produced with the aid of an element 4 made of shape-memory alloy (SMA).

These SMA materials have been studied for many years throughout the world (see, in particular, the article "Shape Memory Alloys" which appeared in Scientific American, the publications "Shape Memory Alloys: Materials in Action" and "General Discussions: The use of Shape Memory Actuators" of the Catholic University of Louvain).

The materials mainly used are of the Ni—Ti type or copper alloys of the Cu—Al—Zn or Cu—Al—Ni type and the memory effect is based on a transition of the martensitic-austenitic type obtained by varying the temperature of the alloy studied, and associated with this memory effect is a change in the crystallographic arrangement inducing a shape change in the alloy.

The range of transition temperatures varies from one alloy type to another and generally lies between approximately −100 and +200° C. Two types of memory effect should be distinguished: the one-way memory effect and the two-way memory effect. The two-way memory effect corresponds to reversibly passing from a high-temperature shape to a low-temperature shape simply by changing the temperature. The one-way effect corresponds to the memorizing of just a single (high or low temperature) shape. The production of springs, wires and sheets made of shape-memory alloys has found many applications in all kinds of fields, ranging from dental surgery to the automobile industry, including domestic appliances (a few potential applications identified are collected in the article by M. van Humbeek: "From a seed to a need: the growth of shape memory applications in Europe").

According to the invention, each temperature-sensor zone is produced with the aid of an SMA element. Preferably, this element is of the type having a two-way memory effect and exerts, in one of its (high-temperature or low-temperature) memorized shapes, stresses on the fibre. These stresses induce microbends which substantially attenuate certain higher-order propagation modes.

Figure 4:
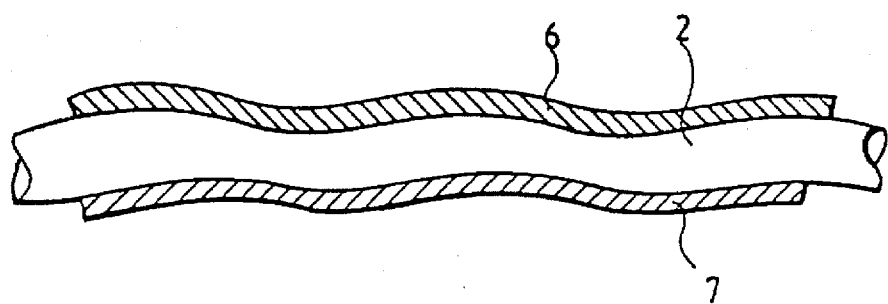
FIG. 4 is a sectional view of a section of optical fibre of FIG. 1 on which is arranged an element made of shape-memory alloy, in accordance with the invention, in the state where it exerts a stress on the optical fibre.
Figure 5:
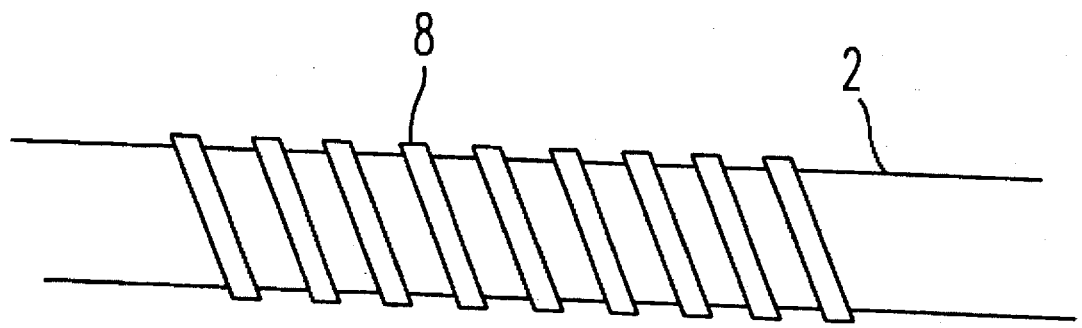
FIG. 5 is a perspective view of another embodiment of the present invention.
Figure 6:
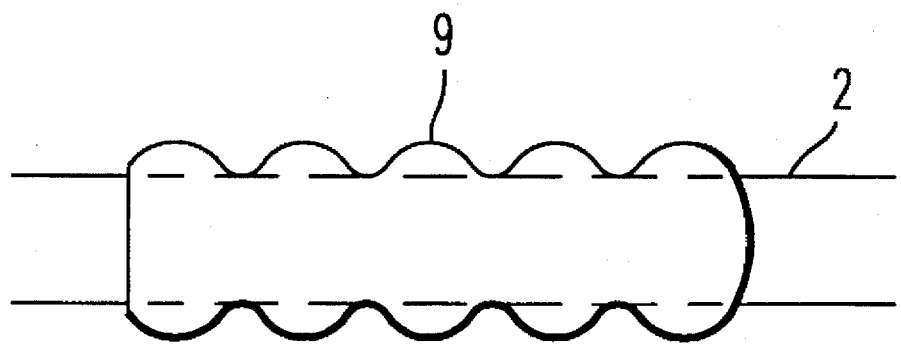
FIG. 6 is a perspective view of still another embodiment of the present invention.

According to a preferred embodiment of the invention, the SMA element is in the form of a tubular helix having non-touching turns, 8, as shown in FIG. 5. According to another embodiment of the invention, the SMA element has an overall shape of a concertinaed tube, 9, as shown in FIG. 6. According to yet another embodiment, the SMA element includes, as depicted in FIG. 4, two corrugated plates 6, 7 which are connected together, for example by screws, and which are advantageously curved. These two plates are offset with respect to each other so as to corrugate the optical fibre slightly, in one of their memorized shapes. The internal diameter of the helix is chosen, for one of the memorized shapes, equal to or slightly greater than the external diameter of the fibre. This external diameter of the fibre generally lies between approximately 250 μm (for example for a polarization-maintaining fibre having an epoxy-acrylate coating) and a few millimetres. The SMA alloy and the diameter of the wire used to produce the helix are chosen so that, for the other memorized shape, the SMA element exerts, on the fibre 2, a sufficiently large stress to be able to be detected by the reader 3, without, however, exceeding the elastic deformation limit of the silica constituting the fibre. In the case where such a risk would exist, the fibre may be fitted with a protective sleeve (for example made of plastic or of PTFE) at the location where the SMA element will be arranged. Of course, in such a case, the internal diameter of the helix takes into account the thickness of this sleeve.

The helix may be shaped either before installing it around the fibre or directly wound on the optical fibre. In the first case, the helix, formed by several turns, generally touching, of SMA wire, is slid along the optical fibre up to the desired position. In the second case, the SMA wire is wound or coiled (advantageously by the technique called "wrapping") around the optical fibre at the desired position. In both cases, the SMA element is installed at a temperature for which the SMA element has its "expanded" shape (which shape corresponds to a helix of internal diameter equal to or greater than the external diameter of the fibre). Generally, the SMA element is such that its "expanded" shape is obtained when it is at a temperature below the transition temperature of the SMA. This transition temperature may be chosen between approximately −100° C. and +200° C., depending on the alloy used, and in this general case it is chosen to be less than the minimum anticipated operating temperature of the SMA elements. However, the reverse case ("expanded" shape corresponding to temperatures greater than the transition temperature of the SMA) may, of course, be envisaged.

Above the transition temperature, the diameter of the helix decreases, thus creating a stress on the fibre, and induces a localized loss of the light flux guided by this optical fibre.

Figure 2:
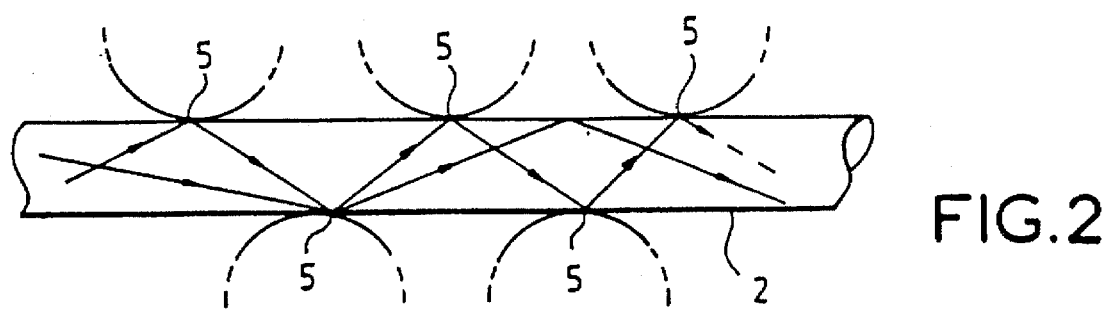
FIG. 2 is a sectional view of a section of multimode optical fibre on which an element made of shape-memory alloy, in its non-contracted state, is arranged, showing in a very simplified way the propagation paths of light waves in this section.

FIG. 2 depicts diagrammatically a section 4 of the optical fibre 2 and those parts 5 of the turns of a helix with non-touching turns made of SMA material in contact with the optical fibre. In the "expanded" state of the SMA element, its turns exert no stress on the fibre 2. The propagation paths of the light waves in the fibre 2 are the usual paths in such a case.

Figure 3:
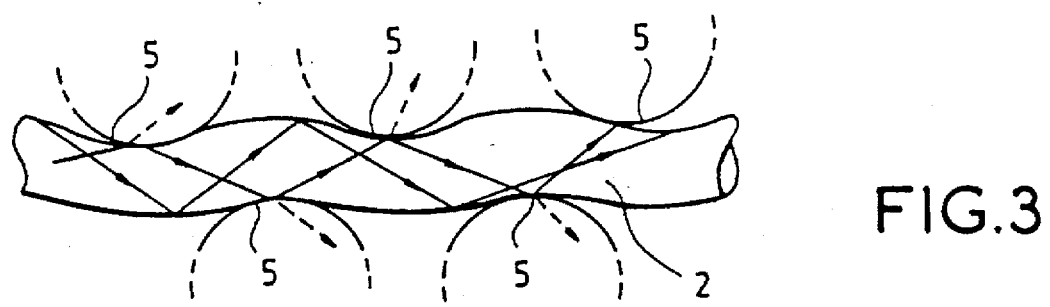
FIG. 3 is a sectional view of a section of the optical fibre of FIG. 2, showing in a very simplified way the mode of action of an element made of shape-memory alloy in accordance with the invention on the propagation of the light waves.

In the "contracted" state of the SMA element (FIG. 3), the parts 5 of the helix in contact with the fibre 2 slightly indent it and create deformations at the fibre/air interface. These deformations modify the distribution of the paths of the light waves which propagate in the fibre 2, because the high-order modes are then no longer guided. This phenomenon is due to the periodic microbends induced in the fibre by the contraction of the helix. These modifications are measured, in a manner known per se, with the aid of the read device 2. From the choice of the SMA alloy of the helix, its transition temperature is adjusted. Consequently, when the reflectometer 3 detects a variation in the light flux due to the contraction of the helix in question, the position of which, with respect to the fibre 2, may be easily determined, it is known that, at this position, the transition temperature in question has been exceeded. For example, if this temperature corresponds to that of the onset of combustion of the materials surrounding the optical fibre 2 with its SMA helix, a fire detector is thus produced.

In order to adjust the sensitivity of the temperature sensor produced with such an optical fibre, the helix made of SMA material applies spatially periodic stresses on the optical fibre. The spatial period is calculated, in a manner known per se (see, for example, the book "Optical Fiber Sensors" of B. CULSHAW and J. DAKIN, Vol. 2, 1989, published by Artech House) as a function of the difference between the propagation constants of the high-order modes which propagate in the fibre.

Below the transition temperature, the SMA material releases the stresses exerted on the optical fibre. The formation of the measurement zone is consequently reversible. It is therefore possible to remove that measurement zone or to move it. Of course, the same is true for all the measurement zones PC1, PC2, etc.

According to a first embodiment of the invention, a multisensor system is produced with the aid of at least one optical fibre along which several identical SMA helices, such as the one described hereinabove, are arranged, each determining one measurement zone. The addressing and reading of the sensors distributed along the optical fibre 2 and corresponding to these measurement zones are carried out in a manner known per se by reflectometry, connecting, as explained hereinabove, one end of the fibre 2 to a light source 1 and the other end to a reflectometer 3. This applies for all the other embodiments of the invention.

According to another embodiment of the invention, the SMA helices have different compositions and therefore different transition temperatures. A distributed-sensor multisensor system is thus formed. These sensors then make it possible to measure several different temperatures (or events in which various temperature thresholds are exceeded) at the same location or at different locations.

According to an illustrative embodiment of the invention, an SMA helix is produced from an SMA wire of a diameter of approximately 60 µm wound on an optical fibre of a diameter of approximately 250 µm. The SMA alloy is, for example, of the Cu—Al—Ni or Ni—Ti type. The length of the helix is then less than 1 mm and the helix is composed of the order of ten non-touching turns.

The applications of the device of the invention are manifold, in particular in the case where optical fibres with fixed and irreversible measurement zones have already been used. In these cases, the invention enables the positions of the measurement zones to be modified.

In summary, the device of the invention enables temperature sensors to be produced simply. The operating temperatures of such sensors can lie within a wide range of values (currently, from approximately $-100°$ C. to $+200°$ C.). In all cases, the measurement zones are reversible, without damaging the optical fibre.

We claim:

1. A temperature sensor comprising:

a light source;

an optical fiber receiving light from said light source;

a time domain reflectometry read device connected to said optical fiber for measuring a variation in light flux; and a plurality of elements made of shape-memory alloy arranged on the optical fiber, each element having a plurality of turns arranged alternately on opposite sides of the optical fiber, wherein each element exerts essentially no stress on the fiber when it is at a temperature on one side of a transition temperature and exerts a stress on the fiber when it is at a temperature on another side of the transition temperature so that the optical fiber is subjected to stress from opposite directions form adjacent turns.

2. A sensor according to claim 1, wherein each element has tubular helical shape.

3. A sensor according to claim 1, wherein each element has a corrugated-concertina shape.

4. A sensor according to claim 1, wherein each element includes two corrugated plates.

5. A sensor according to claim 1, wherein said plurality of elements have different transition temperatures.

* * * * *